United States Patent Office

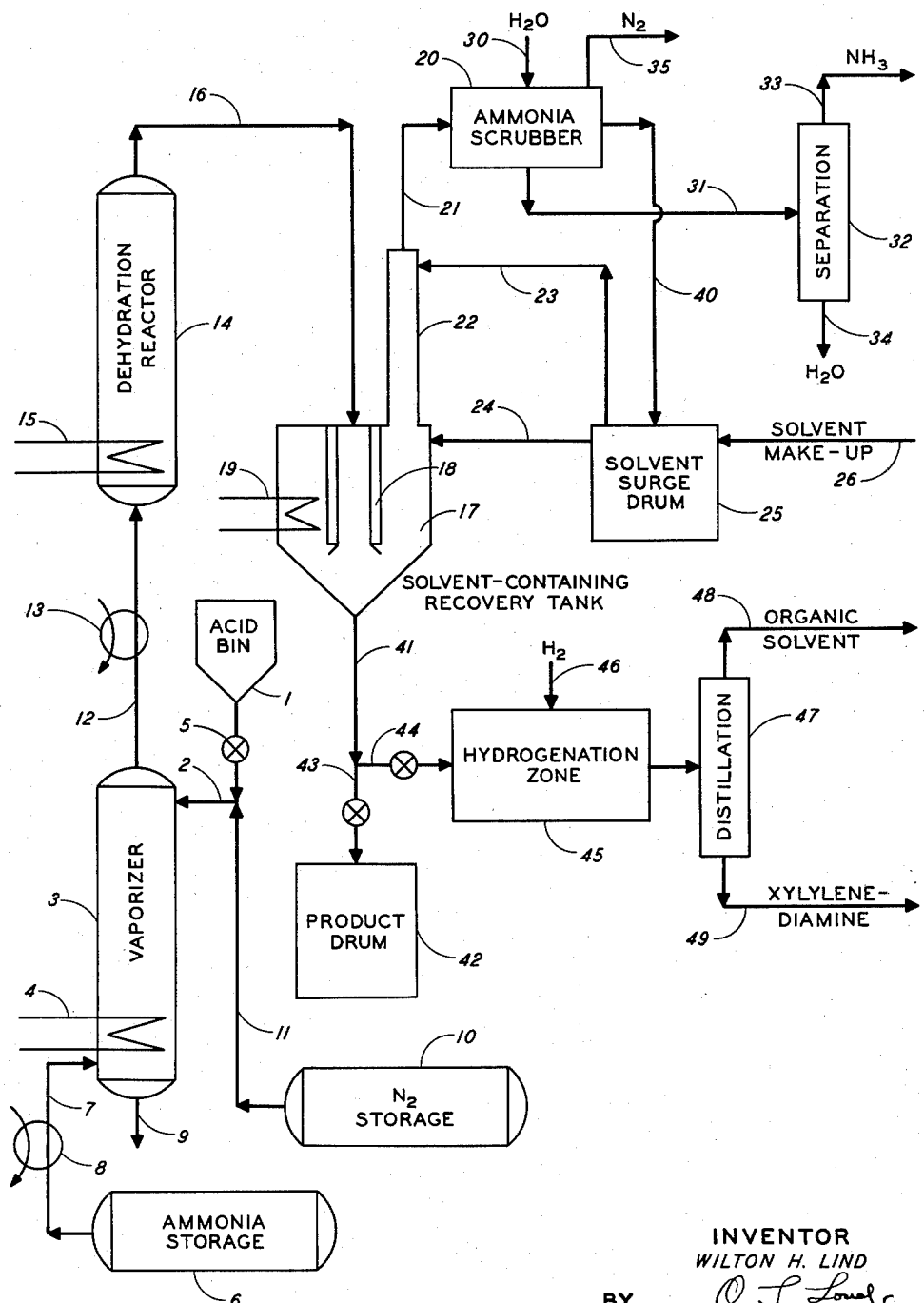

2,970,170
Patented Jan. 31, 1961

2,970,170

PREPARATION OF XYLYLENEDIAMINES

Wilton H. Lind, Walnut Creek, Calif., assignor to California Research Corporation, San Francisco, Calif., a corporation of Delaware Filed Mar. 22, 1957, Ser. No. 647,800

2 Claims. (Cl. 260—570.9)

This invention relates to a process for the preparation of diamines from nitriles. More particularly, the invention relates to the preparation of xylylenediamines by the hydrogenation of isophthalonitrile and terephthalonitrile.

Metaxylylenediamine and paraxylylenediamine are useful as intermediates in organic synthesis, for example, in the preparation of linear polymers such as metaxylylenediamine adipic polymer and other polymers for synthetic fiber use. They are also useful in conjunction with epoxy resins, the manufacture of di-isocyanates employed in the manufacture of synthetic rubber, foam-type resins, etc.

Metaxylylenediamine and paraxylylenediamine may be produced from phthalonitriles prepared, for example, by contacting phthalic acid and ammonia in the presence of a dehydration catalyst such as alumina at elevated temperatures, recovering phthalonitrile from the resulting vapors by condensing or dissolving the vapors in a liquid recovery medium, for example, water or a suitable organic solvent, and obtaining purified phthalonitrile from the recovery medium by various steps which may include distillation, filtration, washing and drying. Thereafter, the phthalonitrile so produced may be hydrogenated in the presence of a hydrogenation catalyst under suitable conditions to produce the xylylenediamine. The various purification steps necessary in obtaining the purified phthalonitrile from the liquid recovery medium heretofore have been expensive and time-consuming factors in the production of xylylenediamine. It is an object of the present invention to provide a practical and unitary process for the production of xylylenediamine starting with phthalic acid, which eliminates the intermediate phthalonitrile purification steps that heretofore have been considered necessary.

In accordance with the present invention, xylylenediamine is prepared in a unitary process comprising the steps of contacting at least one solid-form acid selected from the group consisting of isophthalic acid and terephthalic acid with gaseous ammonia under such conditions that a phthalonitrile-containing mixture is produced, passing said mixture into a phthalonitrile recovery zone containing a liquid which is a solvent for said phthalonitrile and which is unreactive under hydrogenating conditions under which said phthalonitrile will react to xylylenediamine, withdrawing from said recovery zone said solvent containing dissolved phthalonitrile, passing said withdrawn solvent and dissolved phthalonitrile into a hydrogenation zone, contacting said dissolved phthalonitrile in the presence of solvent and a hydrogenation catalyst in said hydrogenation zone with hydrogen under hydrogenating conditions to produce xylylenediamine, and separating said xylylenediamine from the effluent from said hydrogenation zone.

The invention will be further understood, and other objects, features, and advantages thereof will be apparent, from the following description when read in connection with the accompanying drawings, which diagrammatically illustrates one embodiment of process flow paths and apparatus for carrying out the process of the invention, including a two-stage phthalonitrile production system embodying a first non-catalytic melt or vaporization zone and a second catalytic dehydration zone.

It will be understood that a one-stage phthalonitrile production system may be used in the process of the invention. A two-stage system has been illustrated in the drawing as a preferred embodiment, because the heat required to completely vaporize isophthalic and terephthalic acids prior to introducing them into the catalytic dehydration zone in the presence of ammonia often presents a problem when a one-stage system, consisting of the dehydration zone only, is used. In the two-stage system shown in a first non-catalytic stage, ammonia and phthalic acid are contacted in a reaction incomplete enough to convert substantially all of the acid to phthalonitrile, but which converts a portion of the acid to phthalonitrile, converts a portion to ammonia-acid reaction products intermediate between phthalic acid and phthalonitrile, and leaves a portion of the acid unconverted. In a second, and catalytic, stage, a completion reaction takes place, in which certain intermediate reaction products are further reacted to the desired phthalonitrile. The kind and degree of reactions involved may be better understood from the following illustration of the overall reaction of phthalic acid to phthalonitrile in the presence of ammonia.

In general, the overall reaction in the conversion of phthalic acid to nitrile by reaction with ammonia may be illustrated as follows, using isophthalic acid as an example:

In arriving at the nitrile, it is believed that ammonia-acid reaction products or products partially converted to the nitrile are formed in accordance with the following equations:

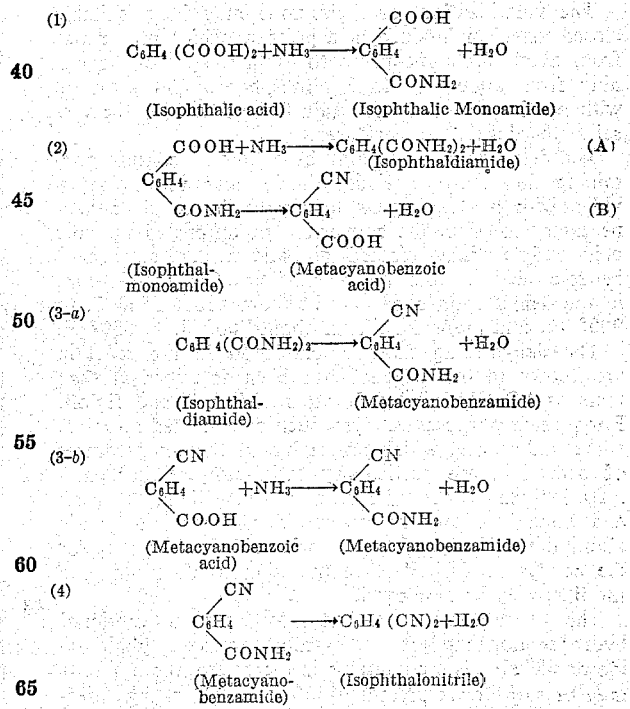

In more detail, the process of the present invention, using the two-stage phthalonitrile production system illustrated in the embodiment shown in the drawing, may be conducted by: continuously charging at least one solid-form acid selected from the group consisting of isophthalic acid and terephthalic acid into a volatilization, or melt, zone; maintaining said zone at a temperature above about 500° F. and below the melting point of said acid; continuously passing gaseous ammonia through said zone, in contact with said acid in said zone, in sufficient quantities to cause to be formed in said zone a molten and relatively volatile mass comprising unreacted portions of said acid and partially reacted portions of said acid comprising ammonia derivatives of said acid, e.g., cyanobenzoic acid, and in sufficient quantities to serve as a carrier for the vapors of said mass; continuously passing from said zone to a dehydration zone said vapors and carrier ammonia; contacting said vapors in said dehydration zone in the presence of a dehydration catalyst, for example, alumina, to remove water and convert unreacted acid and partially reacted acid to phthalonitrile; passing the effluent from said dehydration zone into a recovery zone and into a hydrocarbon-containing liquid therein which is a solvent for the phthalonitrile so produced and which is unreactive under hydrogenating conditions under which the phthalonitrile will react to xylylenediamine, said solvent being maintained in said recovery zone at a temperature, for example, above 200° F., where it will dissolve said phthalonitrile; passing the resulting solvent-phthalonitrile mixture from said recovery zone to a catalytic hydrogenation zone; contacting said phthalonitrile in the presence of said solvent and a hydrogenation catalyst in said hydrogenation zone with hydrogen under hydrogenating conditions to produce xylylenediamine, and recovering said xylylenediamine from the effluent from said hydrogenation zone.

It has been ascertained that the above-mentioned molten and relatively volatile mass, or melt, is formed when 5 to 70% of the carboxyl groups have reacted with the ammonia. A suitable melt is one having 20 to 30% of the number of carboxyl groups reacted with the ammonia. As will occur to those skilled in the art, this number may be determined by a carboxyl number determination, and controlled by rate of removal of the volatile products and addition of acid.

The volatilization, or melt, zone may be a suitable closed vessel maintained at a pressure which may range from about 0.1 atmosphere to 20 atmospheres, preferably from about 0.8 to 3 atmospheres, and provided with heating means to maintain the contents of the vessel at the desired temperatures.

The dehydration zone may be a tube or column containing the appropriate dehydration catalyst and provided with heating means to supply the requisite heat necessary to effect the conversion of unreacted phthalic acid and partially reacted phthalic acid, e.g., cyanobenzoic acid, to the phthalonitrile. The temperature in the dehydration zone may be from about 650° F. to 900° F., and preferably from about 700° F. to 850° F.

The dehydrating catalysts employed in the reaction are known to the art and have been described in such texts as "Catalysis," by Berkman, Morrell and Egloff. For present purposes catalysts such as activated alumina, silica and thoria, which are stable at the temperatures of operation, are particularly satisfactory. Other catalysts include oxides of zirconium, beryllium, tungsten and vanadium and basic aluminum phosphate, basic aluminum sulfate, and phosphoric acid. If a support for the catalyst is desired, such materials as alundum, and the like, may be employed.

The hydrogenation catalyst may be a conventional hydrogenation catalyst, for example, reduced cobalt oxide or nickel. The conditions in the hydrogenation zone may be as follows: pressure 1500 to 10,000 p.s.i.g., preferably from about 2000 to 5000 p.s.i.g.; temperature 180° F. to 400° F., preferably from about 220° F. to 325° F.; space rate 0.05 to 8 grams phthalonitrile per cubic centimeter of catalyst per hour, preferably from about 0.15 to 4 grams phthalonitrile per cubic centimeter of catalyst per hour; make-up hydrogen rate, excluding recycle hydrogen which may be used if desired, 4 to 20 moles $H_2$ per mole of phthalonitrile, preferably from about 6 to 16 moles $H_2$ per mole of phthalonitrile. If desired, the reaction may be carried out in the presence of ammonia, added in amounts sufficient to suppress side reactions to the extent desired, for example, from 10 to 50 weight percent of the total feed to the hydrogenation zone.

The solvent-phthalonitrile ratio in the mixture entering the hydrogenation zone may vary widely, depending upon a number of factors, including the type of solvent used, temperature in the solvent recovery zone, hydrogenation rate desired, and yield desired. However, it may be said generally that passing the solvent-phthalonitrile mixture directly to the hydrogenation zone without first recovering phthalonitrile from the solvent results in a reduced hydrogenation rate compared with the rate which exists without a solvent present or with a fresh solvent added after the phthalonitrile has been recovered from the original solvent. This is particularly true when a nickel hydrogenation catalyst is used. Further, it may be said generally that the presence of the solvent results in increased xylyenediamine yields, particularly at higher hydrogenation temperatures. Less solvent is necessary in the solvent recovery zone as that zone is operated at higher temperatures. However, there are practical temperature limits for that zone that are imposed, for example, by the phthalonitrile and solvent vapor pressures, which should be kept down to a reasonable level. For example, with xylene as the solvent, it has been found desirable to maintain the xylene temperature near the lower portion of the recovery zone shown in the accompanying drawing at from 200° F. to 300° F., preferably from about 220° F. to 240° F. In these temperature ranges it has been found desirable from the standpoint of subsequent hydrogenation to have the effluent from the recovery zone contain from about 50% by weight to about 90% by weight of the xylene solvent, and preferably from about 65% by weight to about 80% by weight.

The solvents to be used in the process of the present invention are inert organic liquids, including alcohols, but preferably aromatic hydrocarbons, for example, xylene. Of the alcohols, isopropyl alcohol is preferred. If desired, the solubility of the phthalonitrile in the solvent may be varied by using a mixed solvent, for example, a mixture of alcohol and an aromatic hydrocarbon, and by adjusting the proportions of the mixture to obtain the desired solubility. It has been found that the solubility parameter, as defined by Hildebrand and Scott in "The Solubility of Nonelectrolytes," of the solvent used should be close to the solubility parameter of the phthalonitrile in order to give the best solubility of the nitrile in the solvent; for most organic compounds of low molecular weight, liquids will be immiscible if the difference in solubility parameters is greater than about 3.6. Isophthalonitrile, for example, has a solubility parameter of about 10.8; therefore, the best solvents for isophthalonitrile on a mole fraction basis have solubility parameters near this figure, for example, from 10 to 11.5. Thus, aliphatic hydrocarbons with solubility parameters in the range 7.0 to 8.2 are very poor solvents for isophthalonitrile, while dioxane, with a solubility parameter of 10.0, is an excellent solvent for isophthalonitrile. While a single solvent, for example, xylene, may be used in the process of the present invention, by proper attention to solubility parameters as discussed above, various mixed solvents may be prepared from hydrocarbon-containing solvents that are inert in the hydrogenation stage. The aromatic hydrocarbons have somewhat lower solubility parameters than would be ideal for dissolving isophthalonitrile, and the solubility parameters of the alcohols are too high. However, by mixing an aromatic hydrocarbon with an alcohol in proper proportions, the solubility parameter can be adjusted toward the ideal. Thus, 60 volume percent benzene mixed with 40 volume percent methanol will dissolve twice as much isophthalonitrile at room temperature than benzene alone, even though methanol is a poorer solvent for isophthalonitrile than benzene. It has been found in the light of the foregoing that the solubility parameter of either a single or a mixed solvent should not differ in either direction from that of the nitrile by more than about 2.5, and preferably not more than 2.0.

Referring now to the drawing, there shown is an embodiment of apparatus and flow paths for carrying out the process of the present invention, with an inert organic solvent, xylene, being used in the phthalonitrile recovery section of the process. Solid isophthalic acid or terephthalic acid, or mixtures of these acids, which may range, for example, from about 5 to 200 mesh, and preferably from about 10 to 100 mesh, are fed from acid bin 1 through line 2 into melt zone on vaporizer 3. Vaporizer 3 is provided with suitable heating means, for example, coil 4. The acid may be introduced into the vaporizer 3 by means of a screw conveyor, not shown, by gravity through star feeder valve 5, or by other suitable means. The contents of vaporizer 3 are heated to a temperature between about 500° F. and 750° F., preferably from about 600° F. to 700° F., while a gaseous stream of preheated ammonia is passed from ammonia storage vessel 6 through line 7 and over or through the contents of vaporizer 3, whereupon a melt of acid and complete and partial reaction products of the acid is formed. Ammonia storage vessel 6 may be maintained under a suitable pressure, for example, 20-60 p.s.i.g., and the ammonia may be passed into vaporizer 3 at the rate, for example, of about 2-5 s.c.f.m. Heat exchanger 8 may be provided to heat the ammonia entering vaporizer 3, for example, to from about 500° F. to 1100° F., preferably from about 800° F. to 900° F. Degradation or undesirable side reaction products, generally having a tarry appearance, may be withdrawn from vaporizer 3 through line 9. Sufficient ammonia is passed through or over the melt in vaporizer 3 to react with the acid and to sweep out the volatile organic gases while phthalic acids are continuously added to the vaporization zone. In general, amounts of ammonia passed through the melt ranging from about 2 moles to 25 moles per mole of acid will be found satisfactory, with amounts toward the upper end of this range, and even above, being preferable as a means of obtaining better phthalic acid vaporization and increased phthalonitrile yields.

If desired, nitrogen may be passed from nitrogen storage tank 10, maintained under a pressure, for example, of 20-60 p.s.i.g., through line 11 to line 2 where shown, to facilitate the passage of acid through line 2 into vaporizer 3 without complications. The nitrogen prevents the ammonia from vaporizer 3 from back-diffusing into the acid feed in line 2. If the fresh acid feed in line 2 were to meet amonia therein, at perhaps 50° F. to 350° F., it would form a sticky, pasty mass, and would thereby complicate acid passage into vaporizer 3. The nitrogen prevents acid-ammonia contact until the acid reaches the vaporizer, and thus facilitates the passage of the acid into the vaporizer.

The gaseous ammonia stream carrying volatilized organic products is passed from vaporizer 3 through line 12 and heat exchanger 13 into dehydration reactor or zone 14. Zone 14 is packed with a dehydration catalyst, for example, activated alumina. The temperature of the stream entering zone 14 through line 12 is maintained, for example, at between about 600° F. and 800° F., and preferably between about 650° F. and 750° F., these lower temperatures being desirable to minimize decarboxylation and benzonitrile production. Reactor 14 is provided with suitable heating means, for example, coil 15, to maintain the temperature in reactor 14 at about, for example, 700° F. to 900° F., and preferably from about 750° F. to 850° F. The space velocity of the acid charge to reactor 14 may be from about 10 pounds per cubic foot per hour to about 350 pounds per cubic foot per hour, and preferably from about 20 to 150 pounds per cubic foot per hour.

The reaction products formed in zone 14 are passed from zone 14 through line 16 to solvent-containing recovery tank 17, provided for the recovery of phthalonitrile from the vapors entering tank 17 through line 16. Line 16 is provided with suitable heating means, not shown, if necessary to insure that the materials in line 16 remain in vapor form until they contact the solvent in tank 17. These line 16 vapors preferably are maintained at a temperature, for example, of from about 600° F. to 800° F., a more desirable range being from about 650° F. to 725° F., to minimize metacyanobenzamide production.

Solvent-containing recovery tank 17 is filled with a hydrocarbon-containing liquid which is a solvent, at the temperatures maintained in tank 17, for the phthalonitrile produced in the process, and preferably the solvent is an inert organic solvent, and still more preferably it is an aromatic hydrocarbon solvent. The solvent must be substantially non-reactive in the subsequent hydrogenation zone with either the phthalonitrile or with the xylylenediamine produced therein. The xylene used in connection with this description of a preferred embodiment is a satisfactory solvent.

Dip tube 18 is provided in recovery tank or zone 17 to guide the incoming vapors into the solvent therein. Tank 17 is maintained, for example, by means of heating coil 19, at a temperature such that phthalonitrile from the incoming vapors satisfactorily dissolves in the selected solvent. In the case of xylene, satisfactory temperatures would be, for example, about 600° F. to 650° F. within dip tube 18, about 300° F. to 400° F. outside of and near the end of dip tube 18, and about 200° F. to 300° F. near the lower portion of the tank.

Ammonia and nitrogen are withdrawn from recovery tank 17 and passed to ammonia scrubber 20 through line 21, first being passed through a column 22, if desired. Column 22 serves to remove traces of phthalonitrile from the withdrawn ammonia and nitrogen stream, by counter-currently scrubbing that stream with xylene introduced into column 22 through line 23. The resulting stream comprising xylene and entrained phthalonitrile passes into recovery tank 17, and serves as the main or only supply of xylene to tank 17 under equilibrium operating conditions. The xylenes in line 23 are maintained, for example, at from about 200° F. to 300° F., at a flow rate sufficient to maintain the desired liquid level in tank 17. During start-up of the process, it may be preferred to introduce xylene directly into tank 17 through line 24, rather than into column 22 through line 23. In either case, the required make-up xylene for the process may be introduced first into solvent surge drum 25 through line 26.

The ammonia-nitrogen stream passing through line 21 to ammonia scrubber 20 may also contain some amounts of other materials, for example, $H_2O$, $CO_2$, $H_2$ and xylenes. Ammonia is scrubbed from this stream with water introduced into scrubber 20 through line 30, and the resulting ammonia-water mixture is passed from scrubber 20 through line 31 to separation zone 32, where the ammonia and water may be separated, ammonia being withdrawn through line 33 and water being withdrawn through line 34.

From ammonia scrubber 20, separated nitrogen may be withdrawn through line 35, and whatever xylene may accumulate above the ammonia-water phase in scrubber 20 may be recovered by passing it therefrom through line 40 to surge drum 24.

From recovery tank 17 a mixture comprising phthalonitrile dissolved in xylene, together with whatever impurities may be present, is passed through line 44 to hydrogenation zone 45 without purification. Prior art practice at this point would require passing the phthalonitrile through line 43 to product drum 42, and thereafter purifying it, or partially purifying it, by an expensive and time-consuming sequence of steps, for example, distillation, filtering, washing, and drying, before it could be used in a subsequent hydrogenation process.

The phthalonitrile-solvent mixture entering hydrogenation zone 45 is contacted therein with hyrogen introduced through line 46, and the phthalonitrile hydrogenated under hydrogenating conditions in the presence of a hydrogenation catalyst, for example, nickel or cobalt oxide. The xylylenediamine so produced then may be separated easily from the effluent from hydrogenation zone 45, for example, by passing the effluent into distillation zone 47, from which the xylene is withdrawn through line 48 and from which the xylylenediamine is withdrawn through line 49 as a product.

The following examples will further serve to illustrate the process of the present invention.

*Example 1*

Metaxylylenediamine was produced using apparatus similar to that illustrated in the attached drawing by continuously feeding solid isophthalic acid to a vaporizer held at 620–660° F. under 18 p.s.i.g. of pressure. A 2.8 to 1 molar ratio of nitrogen to isophthalic acid was used to facilitate feeding of the solid acid. In the vaporizer each mole of isophthalic acid was contacted with 19–20 moles of ammonia gas which had been preheated to 900–910° F. A melt of partially reacted isophthalic acid was formed, and this melt was vaporized and was swept out by the excess ammonia. These gases were then passed into the reactor, at a space rate of 63–65 pounds of acid charge per cubic foot per hour, where the isophthalonitrile producing reaction was completed over a dehydration-type, alumina catalyst at a temperature of 750–850° F., and under a pressure of 1 p.s.i.g. The isophthalonitrile vapor, along with vaporous byproduct ammonia, nitrogen, water, benzonitrile, metacyanobenzamide, hydrogen, xylenes, and carbon dioxide, were passed out of the reactor at 850–900° F. into a xylene-containing recovery tank held at 235° F. and under atmospheric pressure where the isophthalonitrile, benzonitrile, and metacyanobenzamide were dissolved by the xylene. This resulting xylene solution contained 31% products of which 97.9% was isophthalonitrile, 1.1% was benzonitrile, and 1.0% was metacyanobenzamide. This xylene solution was then charged to a rocking autoclave along with a cobalt hydrogenation-type catalyst, and ammonia in an amount of about 25 weight percent, based on the total feed to the hydrogenation zone. The hydrogenation was then carried out at 250° F. and under 3000 p.s.i.g. pressure. A hydrogenation rate of 0.54 gm. isophthalonitrile per cubic centimeter of catalyst per hour was obtained. The resulting product contained 90.4% metaxylylenediamine, representing a 92.3% molar yield, 0.8% monoamines, and 8.8% tars.

*Example 2*

A solution containing 31% crude isophthalonitrile in xylene was produced in a manner similar to that outlined in Example 1. This solution was then charged to a rocked autoclave with a Raney-nickel hydrogenation catalyst, and ammonia in an amount of 25 weight percent, based on the total feed to the hydrogenation zone. The hydrogenation was then carried out at 250° F. and under a pressure of 2000 p.s.i.g. A hydrogenation rate of 1.15 gm. isophthalonitrile per gram nickel catalyst per hour was obtained, giving a 90.3% molar yield of metaxylylenediamine.

In addition to savings in phthalonitrile purification costs, it has been found that the method of the present invention avoids solids handling problems, plugging of system lines, and many other problems associated with the prior art method of purifying the phthalonitrile prior to its hydrogenation to xylylenediamine.

Obviously, many modifications and variations of the invention may be made without departing from the spirit and scope thereof and all such modifications and variations are intended to be covered by the appended claims, except for specific limitations to the contrary in the claims.

I claim:

1. A process which comprises continuously introducing at least two mols of gaseous ammonia and one mol of an acid selected from the group consisting of solid isophthalic acid, solid terephthalic acid and mixtures of said acids into a non-catalytic reaction-vaporization zone maintained at a temperature of about 500° F. to about 750° F. to react about 5% to about 70% of the carboxyl groups of said acid with ammonia, passing the resultant vapors into a catalytic reaction zone and contacting them with a dehydration catalyst maintained at a temperature of about 700° F. to about 900° F. to produce phthalonitrile as the principal dehydration product, quenching the hot effluent vapors from said zone by contacting them with an inert liquid organic solvent having a solubility parameter within about 2.5 of the solubility parameter of said phthalonitrile, separating gaseous components including unreacted ammonia and water from the hot solution of phthalonitrile, passing said solution together with hydrogen into a hydrogenation zone and into contact with a hydrogenation catalyst at a temperature of about 180° F. to about 400° F. and recovering the amine product from the effluent from said hydrogenation zone.

2. The process of claim 1 wherein ammonia in an amount of at least about 10% by weight of the total feed is passed to said hydrogenation zone with said solution of phthalonitrile and the hydrogen, and wherein the product is primarily xylylenediamine.

References Cited in the file of this patent

UNITED STATES PATENTS

| | | |
|---|---|---|
| 2,166,971 | Schmidt et al. | July 25, 1939 |
| 2,591,493 | Arnold et al. | Apr. 1, 1952 |
| 2,844,631 | Wilkes | July 22, 1958 |

OTHER REFERENCES

Wagner et al.: "Synthetic Organic Chemistry" 2nd edition (1953), pages 658–9 relied on.

UNITED STATES PATENT OFFICE
CERTIFICATION OF CORRECTION

Patent No. 2,970,170                          January 31, 1961

Wilton H. Lind

It is hereby certified that error appears in the above numbered patent requiring correction and that the said Letters Patent should read as corrected below.

Column 1, line 71, for "drawings" read -- drawing --; column 2, line 32, the left-hand portion of the formula should appear as shown below instead of as in the patent:

$$C_6H_4(COOH)_2 + 2NH_3$$

column 3, line 35, for "20" read -- 10 --; column 4, line 23, for "xylyenediamine" read -- xylylenediamine --.

Signed and sealed this 1st day of August 1961.

(SEAL)
Attest:

ERNEST W. SWIDER                         DAVID L. LADD
Attesting Officer                          Commissioner of Paten'